United States Patent
Guitton et al.

(10) Patent No.: US 8,240,978 B2
(45) Date of Patent: Aug. 14, 2012

(54) METHOD FOR FAN CONTROL ACCORDING TO THE POSITION OF A DEVICE AND DEVICE IMPLEMENTING THE PROCEDURE

(75) Inventors: Xavier Guitton, Chasne sur Illet (FR); Anthony Aubin, Bourgbarre (FR); Maurice Fritsch, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 681 days.

(21) Appl. No.: 12/456,742

(22) Filed: Jun. 22, 2009

(65) Prior Publication Data

US 2010/0111666 A1    May 6, 2010

(30) Foreign Application Priority Data

Jun. 23, 2008   (FR) ..................... 08 54143

(51) Int. Cl.
*F03B 15/00*  (2006.01)
*F03B 15/06*  (2006.01)
*F04D 15/00*  (2006.01)

(52) U.S. Cl. .......................... 415/14; 415/17
(58) Field of Classification Search ............... 415/17, 415/14, 19
See application file for complete search history.

(56) References Cited

U.S. PATENT DOCUMENTS

| 6,542,846 | B1 | 4/2003 | Miller et al. |
| 7,980,971 | B2 * | 7/2011 | Martino ............ 473/570 |
| 2002/0076213 | A1 * | 6/2002 | Pelonis ............ 392/358 |
| 2006/0155424 | A1 | 7/2006 | Katoh et al. |
| 2007/0152552 | A1 | 7/2007 | Shih et al. |
| 2007/0296408 | A1 | 12/2007 | Liao et al. |

FOREIGN PATENT DOCUMENTS

JP   2004 265373   9/2004

OTHER PUBLICATIONS

Search Report dated Mar. 5, 2009.

* cited by examiner

*Primary Examiner* — Dwayne J White
(74) *Attorney, Agent, or Firm* — Robert D. Shedd; Jeffrey M. Navon; Jerome G. Schaefer

(57) ABSTRACT

The present invention relates to a control method for the operation of a fan equipping an electronic device. A determination step detects the vertical or horizontal position of the electronic device. The fan is not started up during the powering up of the device while the device is in a vertical position. The flow of air produced by the "fireplace" effect in the device in a vertical position suffices to ensure correct ventilation. According to an improvement the device has a sensor measuring the internal temperature of the device, whatever the position of the device, the fan being started up from a determined temperature. The present invention relates also to a device implementing the method.

12 Claims, 3 Drawing Sheets

Fig. 4.a

5 Fan stopped during powering up

5 Fan started at the beginning of powering up

Fig. 4.b

METHOD FOR FAN CONTROL ACCORDING TO THE POSITION OF A DEVICE AND DEVICE IMPLEMENTING THE PROCEDURE

This application claims the benefit, under 35 U.S.C. §119 of EP Patent Application 0854143, filed Jun. 23, 2008.

FIELD OF THE INVENTION

The present invention relates to a control method for a fan according to the horizontal or vertical position of a device. The present invention relates also to a device which implements the method.

BACKGROUND

Electronic devices consume a great deal of energy during normal operation. This energy is transformed into heat that is concentrated within devices that are generally sealed. With the concentration of integrated circuits, the electronics of a modern device release more heat per unit of surface than older devices. This concentration leads to a temperature increase which is eventually prejudicial to the reliability of the integrated circuits and other sensitive elements such as central processing units or the hard disk. To resolve this problem, a cooling system is implemented into the electronic devices using one or several fans which blow cool air from the exterior in order to cool the interior. The integration of a hard disk into television decoders, thus enabling the functions of a PVR (Personal Video Recorder), considerably increases the heat released by the set of active circuits. For example, it is not rare to find on the market dual reception High Definition PVR products having an average consumption in the order of 40 W.

If it is not evacuated, this heat provokes an accelerated aging of the electronic components that results in an irreversible deterioration. To avoid this, the manufacturers cut air inlets in the device box to enable the evacuation of the hot hair. A fan is positioned in front of the air inlets to accelerate the exchanges with the exterior and allow correct internal cooling. But using a ventilator at full speed is noisy. If the device is a television decoder which can, for example, be located in a bedroom, in this case, it must not disturb the users sleep. The maximum threshold usually authorized is twenty five decibels. This measure is realized according to the Sound Pressure method, i.e. using a microphone positioned at one meter from the front panel of the decoder.

To reduce the sound level, the servo system of the fan checks regularly the speed and modulates it according to a directive to be attained. A temperature sensor is positioned in an area of the device that is usually hot. As soon as a temperature threshold is reached or exceeded, the fan speed increases proportionally to the difference between the temperature threshold and the value measured by the sensor. During switching on of the device, the fan is turned on at slow speed, and as soon as the temperature exceeds 50° C. inside the device, the fan speed is increased. If a certain rotation speed is exceeded, the device becomes noisy. To control its operation, the fan is fitted with a tachymetric sensor which transmits a signal according to the real speed of the blades. The control unit of the fan analyses the signals coming from the tachymetric sensor and ensures regulation of the fan speed. The regulation is carried out by a of PDI (P for proportional, D for differential and I for integral) type automation. This efficient automation enables precise regulation of the speed, by adjusting the command supplied to the fan according to a directive calculated from values measured by the tachymetric sensor.

The electronic components experiencing difficulties in supporting excessive heat, the designers are confronted with the following dilemma: either to privilege the absence of noise and risk an overheating of the components, or to ventilate the interior of the device as well as possible but rendering it noisy. The present invention enables among other things the resolution of the dilemma, at least under certain circumstances.

Recently, the designers of electronic devices have discovered that by positioning a device vertically, the presence of air inlets at the top and bottom of the structure enables an increased level of natural convection inside the device, as for a fire in a fireplace. This fireplace effect considerably increases the natural cooling of the device. The present invention takes into account this convection phenomenon and takes advantage of it to minimize the noise produced by the device.

The document US 2007/296408—LIAO TS-HSINE describes a system for controlling temperature using electronic sensors and a system for controlling a plurality of fans. The sensors are spread over the printed circuit and then provide a mapping of the heat dissipated. Each value is compared with a threshold value associated with the area where the sensor is located, and if the value is exceeded, one or several fans are enabled (to cool the area considered).

The document US 2006/155424—KATOH TAKAYUKI describes an air-cooling mechanism for a mobile PC. A fan is used to cool the interior. An accelerometer detects a displacement of the PC, which changes its operating state. In this new operating state, the processor carries out a measurement of the temperature and possibly changes the fan speed or the internal clock of the PC.

The document U.S. Pat. No. 6,542,846—MILLER describes the temperature regulation of a device which comprises batteries. Some sensors measure the heat released by the batteries and according to the measurement, determine if it is necessary to change the cooling-fan control. Several fans can be used to cool specific areas.

All these documents relate a speed regulation based on the temperature sensor, and thus the activation of the fan whatever the position of the devices described in these documents. Hence, on being powered on, the devices are noisy though it is perhaps unnecessary.

SUMMARY OF THE INVENTION

Accordingly, one of the purposes of the present invention is a method for controlling the operation of a fan equipping an electronic device, wherein it includes a step of determining the vertical or horizontal position of the electronic device, the fan not being turned on during the powering up of the device when the device is in vertical position.

In this way, if the device detects, during the powering up, that it is in vertical position, then this position may be sufficient to ensure correct ventilation without the need to turn on the fan.

According to a first improvement, a measurement of the internal temperature is carried out in the device. Whatever the position of the device, the fan is turned on from a determined temperature. In this way, there is no risk of device damage following, for example, blockages of the ventilation air-inlets.

According to another improvement, a light and/or sound signal is transmitted to indicate that the fan is turned on and that the device is in a vertical position. In this way, the user is informed of a malfunction of the device due to a too high increase in temperature.

Another object of the present invention is a device fitted with electronic circuits and a fan for its internal cooling, the device being able to take an horizontal or vertical position; wherein it includes a detector which determines the device position, and a control means which inhibits the start-up of the fan during the powering up of the device when the device is in a vertical position.

According to an improvement, the fan is placed on the side at the bottom of the device in a vertical position, and blows the external air into the device. In this way, the maximum noise generated by the air flow is located inside the device and not outside of the device. According to another improvement, the circuits which dissipate the most heat are arranged close to the lower air inlet of the fan when the device is in a vertical position. In this way, the circuits are more efficiently cooled.

BRIEF DESCRIPTION OF THE DRAWINGS

Other characteristics and advantages of the present invention will emerge from the description of the following embodiments to be taken as non-restrictive examples, made with reference to the figures attached wherein.

DETAILED DESCRIPTION

Figure 1:
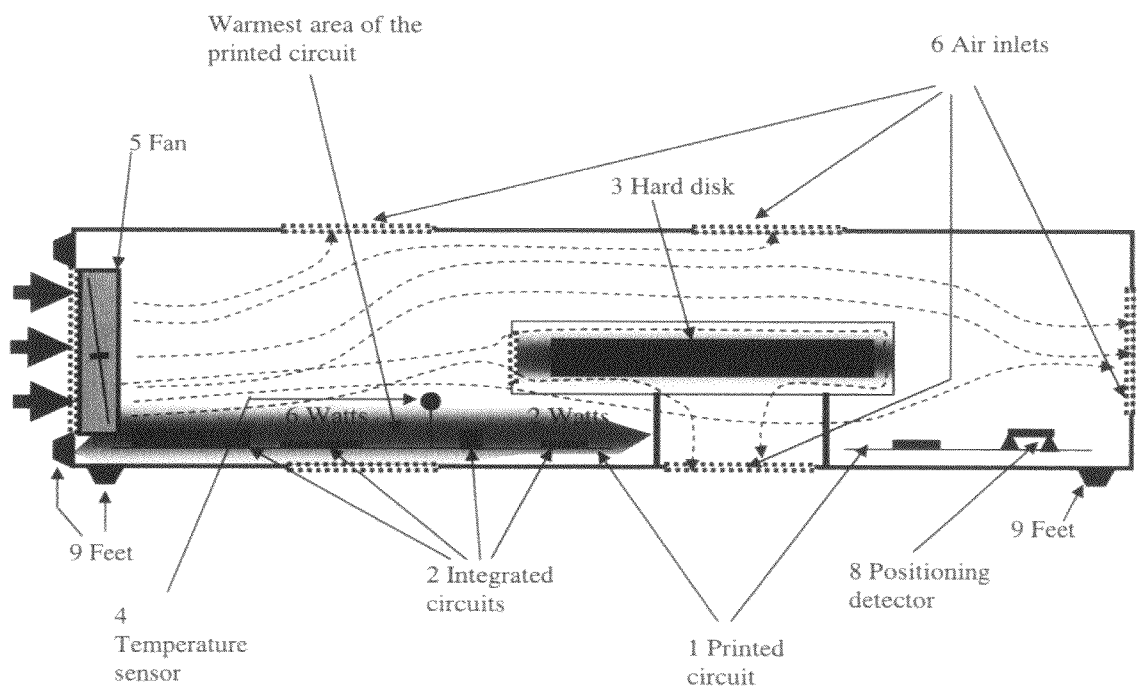
FIG. 1 shows a section of an electronic device according to an embodiment of the invention.

FIG. 1 describes a section of an electronic device, a television decoder for example. The device comprises a printed circuit 1 on which the electronic circuits 2 are arranged. A hard disk 3 enables recording of data, particularly of lengthy audiovisual works. The circuits 2 and the disk 3 consume a lot of power and emanate heat, for example, for a television decoder dissipating 17 Watts, its central processing unit releases itself a heat level of approximately 3 Watts. As a result, certain zones of the decoder, marked in grey on FIG. 1, are warmer than others. A temperature sensor 4 located within one of these hot areas, preferably close to the circuit which produces the most heat, provides a voltage proportional to the temperature. A fan 5 provides cool air from the exterior and transfers it to the decoder cavity via an opening realized on the left side of the device. Several air inlets 6 cut in the decoder box allow the outlet of the hot air, from the underside, the right side and the top. Curved arrows shown on FIG. 1 show the path of the air flows. The number, the position and the size of the air inlets are important elements of good ventilation, these parameters being well known to those skilled in the art. A device positioning detector 8 is positioned on the decoder printed circuit. Four feet 9 are positioned beneath the device when it is placed on a flat surface, as well as four other feet 9 on the left side.

The fan is preferentially positioned by the air inlet on the underside when the decoder is in a vertical position. In fact, the noise is mainly generated at the fan air inlets level, where there is a narrowing of the air flow. This noise being added to that generated by the fan, a maximum sound level is measured inside and not outside the decoder. Moreover, in a vertical position, the sound is mitigated by the exiguous air space situated under the decoder, whereas it would be much less if the fan were positioned on the top of the decoder. Care must be taken that the height of the feet 9 ensure a sufficient air intake and do not block a ventilation inlet.

Figure 2:
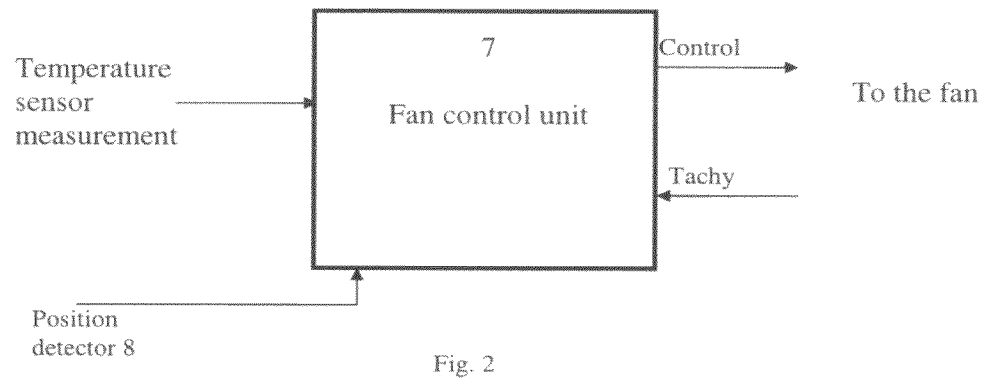
FIG. 2 shows a servo system according to a preferred embodiment.

FIG. 2 shows a fan control system according to a preferred embodiment. The temperature sensor 4, the fan 5 and the positioning detector 8 are connected to a management unit 7. The management unit can be a microcontroller dedicated to the fan control. The management unit 7 can also be a part of the decoder central processing unit. Whatever its nature, the management unit 7 has at least an analog input for the reception of signals from the temperature sensor 4 and two digital inputs to receive the digital signals from the detector 8 and from the tachymetric sensor (these latter signals called "Tachy" are representative of the fan speed). The management unit 7 is equipped with a control output for the control of the fan 5. According to the measurement realized by the sensor 4, the Tachy signals and the information provided by the positioning detector 5, the microcontroller 7 triggers or does not trigger the fan rotation and determines its set speed to create a cool air flow sufficient to maintain the inside of the decoder below a nominal temperature.

In the embodiment, the fan is controlled by an analog signal which directly controls the rotation speed of the fan. Measurements have demonstrated a correlation between a number of decibels and a given speed, and thus a control value applied to the fan. It implies then use of the fan only when required and at the lowest possible speed.

The positioning detector 8 determines if the decoder is placed in a vertical position or in a horizontal position. According to a simple embodiment, the detector is a REED type relay which consists of a mercury drop which moves in a glass tube having two electrodes. If the tube is placed flat, an electric contact can be established between both electrodes. If the tube is in a vertical position, there is no electrical contact. As a variant, a simple low pressure push-button placed under the decoder can be used, the decoder's weight is sufficient for closing the electrical contact. When the decoder is in a vertical position, the contact is open.

Figure 3:
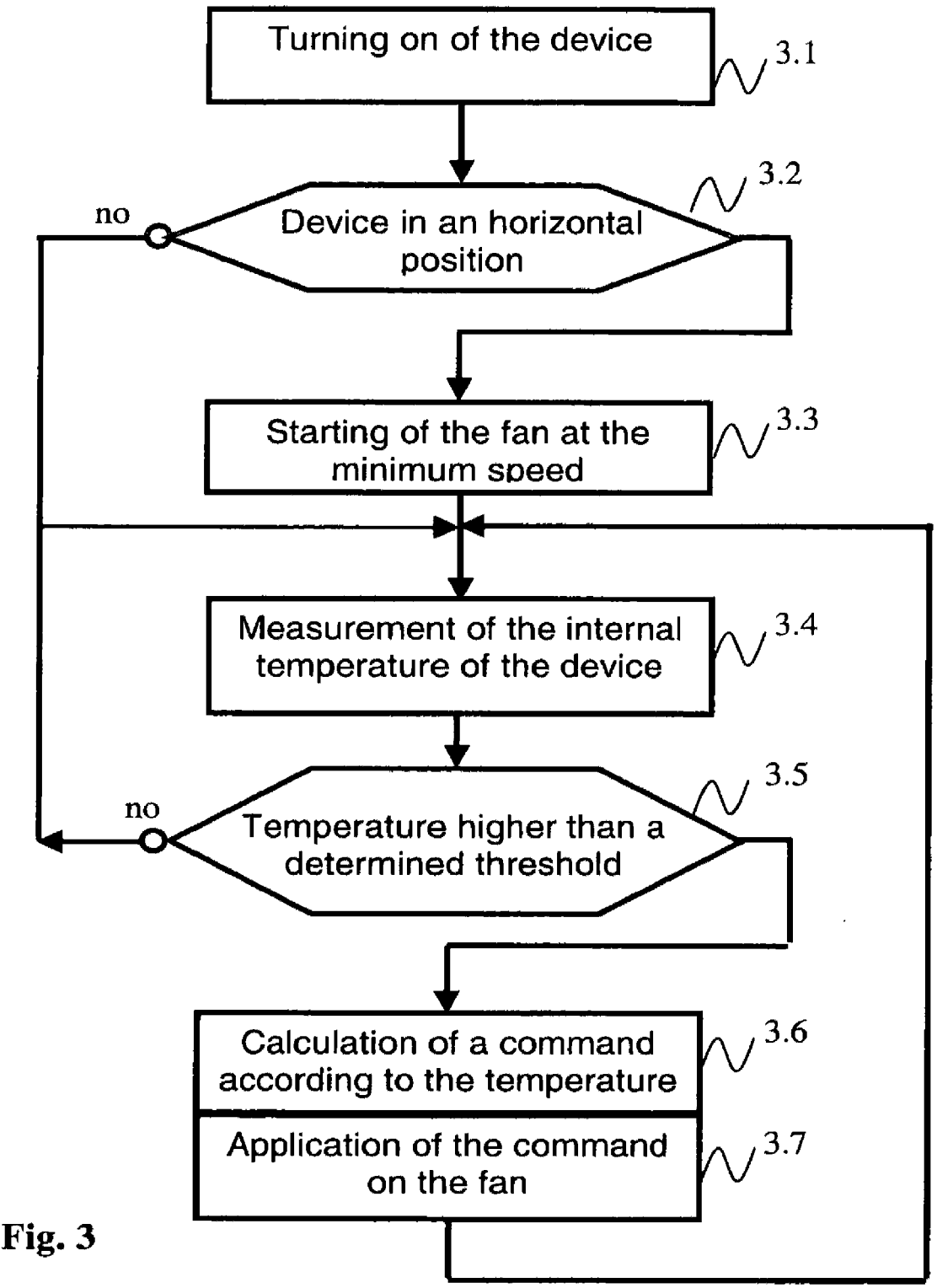
FIG. 3 shows a flowchart of the main steps of the method according to an embodiment of the invention.

After having detailed the different elements that compose the device and the fan control system, how they cooperate is now shown. The main steps, the object of the method, are described by the flowchart of FIG. 3.

In step 3.1, the decoder is turned on. At the beginning of the powering up, the management unit 7 analyses the signal coming from the positioning detector 8 in order to determine if the decoder is in a vertical or horizontal position (step 3.2). If the device is in a horizontal position, the management unit turns on the fan at a minimum speed considering that in any case, it is necessary for correct operation (step 3.3). If the device is detected as being in a vertical position, it is no doubt unnecessary to turn on the fan, as the fireplace effect ensures a minimum air flow between the lower air inlets and the upper air inlets. In step 3.4, the management unit analyses the temperature provided by the temperature sensor 4. In step 3.5, the temperature measured is compared to a maximum temperature threshold value. This temperature depends on the characteristics of the components which dissipate the most heat, which are generally the central processing units. If the temperature measured is lower than the threshold value, the management program loops at step 3.4, without changing the fan command. However, if the temperature measured is greater than the threshold, the management unit calculates a command value of the fan which depends at least on the temperature measured (step 3.6). In step 3.7, the command value calculated is applied to the fan, thus ensuring an efficient cooling of the components.

The fact of measuring the temperature even if the decoder is in a vertical position provides an additional guarantee of correct operation. Indeed, if the grids situated at the level of the fan air inlets are blocked by an object or by dust, it becomes necessary to turn on the fan even if the decoder is in vertical position.

Figure 4:
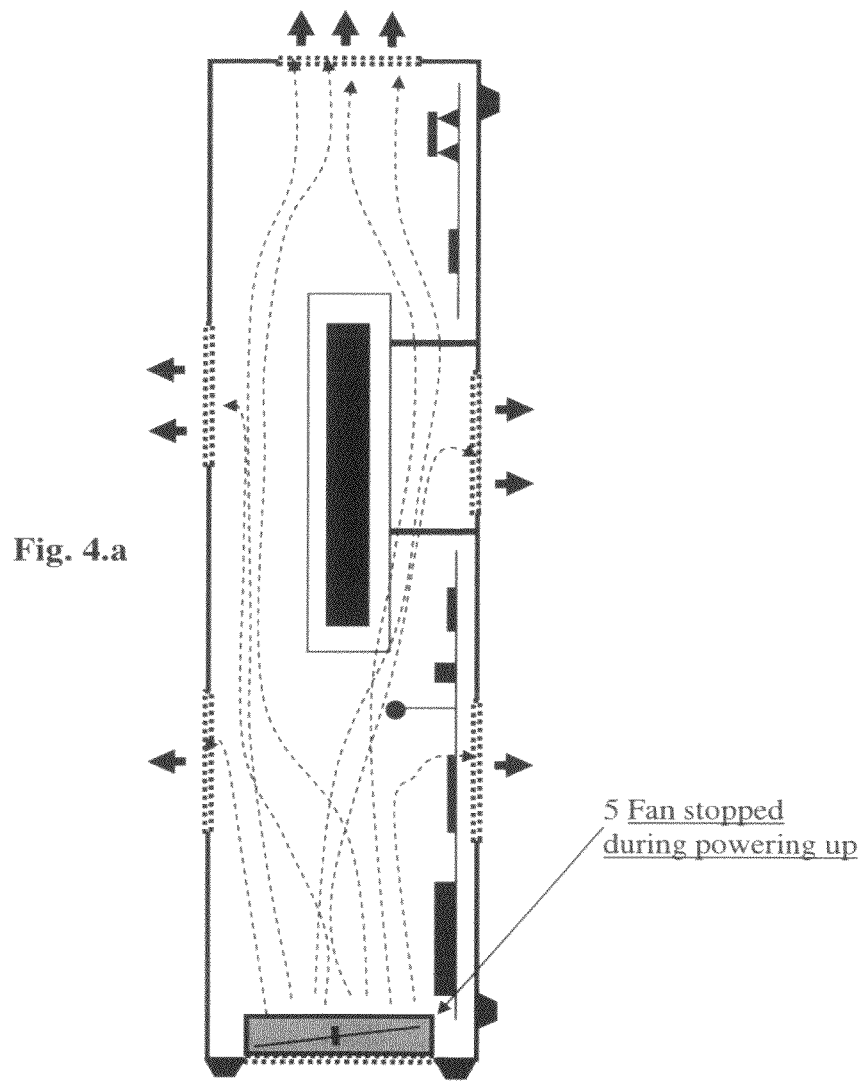
FIG. 4 shows an electronic device in vertical position (FIG. 4.a) and in horizontal position (FIG. 4.b), the fan running in this latter case.
Figure 4:
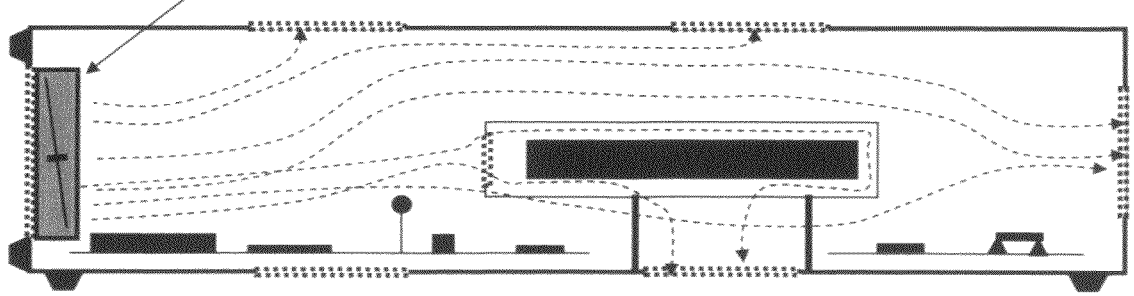

FIG. 4.*a* shows the decoder in vertical position and FIG. 4.*b* in horizontal position. In vertical position, the air flows illustrated by dotted arrows show that the air enters by the lower air inlets and the intermediate air inlets, and mostly exits by the upper air inlet, the rate is sufficient without operation of the fan. In horizontal position (FIG. 4.*b*), there is no "fireplace" effect anymore, the fan 5 sends the cool air from the exterior into the decoder cavity. The input of cool air through the different air inlets 6 cools the interior of the decoder.

Some tests have been carried out on a digital television decoder having a parallel-piped form of dimensions 29.5 centimeters in length, 18 centimeters in width and 5 centimeters in depth, containing a printed circuit whose electronic circuits dissipate 17 Watts. The fan dimensions are 4 centimeters in length, 4 centimeters in width and 2 centimeters in depth. The measurements carried out on the printed circuit by the sensor and on the decoder central processing unit are the following:

| Measurement conditions | T° measured inside | T° measured C.U. |
|---|---|---|
| Decoder in a horizontal position, fan turned off | 58° C. | 105° C. |
| Decoder in a horizontal position, fan at 2000 rpm | 53° C. | 98° C. |
| Decoder in a horizontal position, fan at 4000 rpm | 42° C. | 90° C. |
| Decoder in a vertical position, fan turned off | 54° C. | 91° C. |

The measurements carried out show that the temperature of a decoder installed vertically is very close to that of a decoder installed horizontally with a fan operating at low speed. The manufacturers generally ensure the correct operation of a circuit below 100° C. measured on the circuit. In the present case, this temperature is not reached when the decoder is in vertical position, fan turned off. If the sensor measures a temperature greater than 54° C., then whatever the position, the fan is turned on.

According to an improvement, a light indicator, a LED diode for example placed on the front panel of the decoder, is controlled by the management unit 7. The indicator light indicates a temperature fault when illuminated. This fault intervenes when the device detects that the decoder is in a vertical position and the temperature measured inside the decoder exceeds the maximum temperature threshold. Thanks to this indication, the user is informed that the air inlets 6 are no longer operational. Thus informed, the user can check that the air inlets are not blocked by an object, or simply by accumulated dust. The indication of such a fault can also be performed via a visual message on a screen linked to the decoder, and/or by a vocal message synthesized by the decoder.

According to another improvement, the components which dissipate the most heat are positioned at the bottom of the printed circuit when the decoder is in vertical position. Indeed, this part of the decoder is the closest to the cool air intake which benefits most from the "fireplace" effect, which enables a better cooling of the circuits. In the example where the decoder length is 29.5 centimeters, the circuits should be placed at a maximum of 6 centimeters from the lower air inlet that is to say at least a sixth of the side length.

Those skilled in the art can adapt the present invention into many other specific forms without diverging from the application domain of the invention as claimed. Consequently, the present embodiments must be considered as being examples but can be modified within the domain defined by the scope of the attached claims.

The invention claimed is:

1. A method for controlling the operation of a fan equipping an electronic device, wherein it includes a step of determining the vertical or horizontal position of the electronic device,
   the fan not being turned on during the powering up of the device when the device is detected as being in a vertical position.

2. The control method according to the claim 1, wherein it comprises a step of turning on the fan at a minimum speed during the powering up of the device when the device is detected as being in a horizontal position.

3. The control method according to the claim 1, wherein it comprises a step of measuring the internal temperature of the device, whatever the position of the device, the fan being turned on from a determined temperature.

4. The control method according to the claim 1, wherein it comprises a step of transmitting a light and/or sound signal indicating that the fan is turned on and the device is detected as being in a vertical position.

5. The control method according to claim 1, wherein the determination step consists in measuring the state of a switch which changes when a part of device weight is exerted on said switch.

6. A device fitted with electronic circuits and a fan for its internal cooling, the device being able to take a horizontal or vertical position; wherein it comprises a detector determining the device position, and a control means of inhibiting the start-up of the fan during the powering up of the device when the device is detected as being in a vertical position.

7. The device according to the claim 6, wherein the control means turns on the fan at a minimum speed during the powering up when the device is detected as being in a horizontal position.

8. The device according to the claim 6, wherein it is provided with a means for measuring the internal temperature of the device, the fan being turned on when a determined temperature is reached whatever the position of the device.

9. The device according to claim 6, wherein it comprises a means for transmitting a signal which can be perceived by a user when the fan is turned on and the device is in a vertical position.

10. The device according to claim 6, wherein the detector is a switch whose state changes when a part of the device weight is exerted on said switch.

11. The device according to claim 6, wherein the fan is positioned on the side, at the bottom of the device in the vertical position, and blows the external air into the device.

12. The device according to claim 6, wherein the circuits which dissipate the most heat are positioned next to the lower air inlet of the fan when the device is in a vertical position.

* * * * *